US012761732B1

(12) United States Patent
Arroyo-Gallego et al.

(10) Patent No.: US 12,761,732 B1
(45) Date of Patent: Oct. 13, 2026

(54) SYSTEMS AND METHODS FOR FACILITATING CUSTOMIZED ARTIFICIAL INTELLIGENCE OUTPUT BASED ON USER NEUROPERFORMANCE STATE

(71) Applicant: Area 2 AI Corporation, Cambridge, MA (US)

(72) Inventors: Teresa Arroyo-Gallego, Madrid (ES); Mark B. Pascarella, Andover, MA (US); Alejandro Acién Ayala, Madrid (ES); María de la Peña Arroyo Gallego, Madrid (ES); Mauro Valentin Ruiz Moreno, Valencia (ES)

(73) Assignee: Area 2 AI Corporation, Cambridge, MA (US)

( * ) Notice: Subject to any disclaimer, the term of this patent is extended or adjusted under 35 U.S.C. 154(b) by 0 days.

(21) Appl. No.: 19/204,352

(22) Filed: May 9, 2025

(51) Int. Cl.
*G06F 3/01* (2006.01)
*G06F 16/3329* (2025.01)
*G06F 16/335* (2019.01)

(52) U.S. Cl.
CPC .......... *G06F 3/015* (2013.01); *G06F 16/3329* (2019.01); *G06F 16/335* (2019.01); *G06F 2203/011* (2013.01)

(58) Field of Classification Search
CPC .... G06F 3/015; G06F 16/3329; G06F 16/335; G06F 2203/011
See application file for complete search history.

(56) References Cited

U.S. PATENT DOCUMENTS

RE40,993 E 11/2009 Westerman
7,668,730 B2 2/2010 Reardan et al.
(Continued)

OTHER PUBLICATIONS

Arroyo-Gallego, T., et al., Detecting Motor Impairment in Early Parkinson's Disease via Natural Typing Interaction With Keyboards: Validation of the neuroQWERTY Approach in an Uncontrolled At-Home Setting; published in Journal of Medical Internet Research, vol. 20, iss. 3, e89, year 2018.
(Continued)

*Primary Examiner* — Anthony Bantamoi
(74) *Attorney, Agent, or Firm* — Outlier Patent Attorneys, PLLC

(57) ABSTRACT

The present invention relates to systems and methods for facilitating customized artificial intelligence (AI) output based on a user's neuroperformance state. The system captures user-device interaction data, such as keystrokes, touches, swipes, and other input metrics, to generate a dynamic neuroprofile for each user. The neuroprofile encompasses cognitive, motor, and behavioral domains, providing a comprehensive understanding of the user's current neurostate and its changes over various time cycles. This neuroprofile information is then provided to AI systems to enable the generation of personalized responses tailored to the user's specific neuroperformance state. By leveraging this additional layer of neuro-based data, the invention aims to enhance the accuracy and relevance of AI-driven interactions across various applications, including search, advertising, and content curation. The system represents a novel approach to improving the personalization and adaptability of AI systems by incorporating real-time user neuroperformance data.

17 Claims, 8 Drawing Sheets

(56) References Cited

U.S. PATENT DOCUMENTS

| | | | |
|---|---|---|---|
| 8,285,658 B1 | 10/2012 | Kellas-Dicks et al. | |
| 8,346,680 B2 | 1/2013 | Castleman et al. | |
| 8,671,347 B2 | 3/2014 | Bromer | |
| 9,538,948 B2 | 1/2017 | Dagum | |
| 9,867,573 B2 | 1/2018 | Giancardo et al. | |
| 10,506,979 B2 | 12/2019 | Giancardo et al. | |
| 10,694,987 B1 | 6/2020 | Samzelius | |
| 10,964,224 B1 | 3/2021 | Zhang et al. | |
| 11,003,839 B1 | 5/2021 | Hatch | |
| 11,017,322 B1 | 5/2021 | Du et al. | |
| 11,029,846 B1 | 6/2021 | Pophale | |
| 11,157,170 B1 | 10/2021 | Fox et al. | |
| 11,164,319 B2 | 11/2021 | Steele | |
| 2005/0065452 A1 | 3/2005 | Thompson | |
| 2006/0195328 A1 | 8/2006 | Abraham et al. | |
| 2006/0280339 A1 | 12/2006 | Cho | |
| 2007/0139362 A1 | 6/2007 | Colton et al. | |
| 2008/0091639 A1 | 4/2008 | Davis et al. | |
| 2008/0098456 A1 | 4/2008 | Alward et al. | |
| 2009/0002178 A1 | 1/2009 | Guday et al. | |
| 2009/0018407 A1 | 1/2009 | Jung et al. | |
| 2009/0024332 A1 | 1/2009 | Karlov et al. | |
| 2009/0281979 A1 | 11/2009 | Tysowski | |
| 2009/0282369 A1 | 11/2009 | Jones | |
| 2012/0021391 A1 | 1/2012 | Elsmore et al. | |
| 2012/0098750 A1 | 4/2012 | Allen et al. | |
| 2012/0235819 A1 | 9/2012 | Watkins et al. | |
| 2013/0158984 A1 | 6/2013 | Myslinski | |
| 2013/0176413 A1 | 7/2013 | Lowry et al. | |
| 2014/0058725 A1 | 2/2014 | Longe et al. | |
| 2014/0074267 A1 | 3/2014 | Alberts et al. | |
| 2014/0164994 A1 | 6/2014 | Myslinski | |
| 2016/0345908 A1 | 12/2016 | Samzelius | |
| 2017/0086727 A1 | 3/2017 | Dagum | |
| 2017/0090749 A1 | 3/2017 | Marsden | |
| 2017/0300472 A1 | 10/2017 | Parikh et al. | |
| 2018/0235548 A1 | 8/2018 | Giancardo et al. | |
| 2018/0300008 A1 | 10/2018 | Rasanen | |
| 2019/0239789 A1 | 8/2019 | Jung et al. | |
| 2019/0311098 A1 | 10/2019 | Baldwin et al. | |
| 2019/0362853 A1 | 11/2019 | Friars et al. | |
| 2020/0057706 A1 | 2/2020 | Rome et al. | |
| 2020/0356182 A1 | 11/2020 | Kamepalli et al. | |
| 2020/0394361 A1 | 12/2020 | Parikh et al. | |
| 2021/0181863 A1 | 6/2021 | Gatson et al. | |
| 2021/0236044 A1 | 8/2021 | Arroyo-Gallego et al. | |
| 2021/0240805 A1 | 8/2021 | Knoppert et al. | |
| 2021/0365630 A1 | 11/2021 | Itani | |
| 2021/0390876 A1* | 12/2021 | Publicover | G09B 19/00 |
| 2022/0083633 A1 | 3/2022 | Hazan | |
| 2022/0273227 A1 | 9/2022 | Chen et al. | |

OTHER PUBLICATIONS

Arroyo-Gallego, T., et al., Detection of Motor Impairment in Parkinson's Disease Via Mobile Touchscreen Typing published in IEEE Transactions on Biomedical Engineering, vol. 64, No. 9, Sep. 2017.

Gao, C., et al., Objective assessment of bradykinesia in Parkinson's disease using evolutionary algorithms: clinical validation; published in Translational Neurodegeneration, 7:18, year 2018.

Giancardo, L., et al., Computer keyboard interaction as an indicator of early Parkinson's disease; published in Scientific Reports, vol. 6, Article 34468, Oct. 2016.

Giancardo, L., et al., Psychomotor Impairment Detection via Finger Interactions with a Computer Keyboard DuringNatural Typing; published in Scientific Reports, vol. 5, Article 9678, Apr. 2015.

Goetz, C., et al_ MDS-UPDRS The MOS-sponsored Revision of the Unified Parkinson's Disease Rating Scale; published 2008.

Iakovakis, D., et al., Screening of Parkinsonian subtle fine-motor impairment from touchscreen typing via deep earning; published in Scientific Reports, vol. 10, Article 12623, Jul. 28, 2020.

International Search Report and Written Opinion by the ISA/US of PCT application No. PCT/US20/65782 dated Apr. 28, 2021.

Lau, S., et al., Clusters and Markers for Keystroke Typing Rhythms; published in Proceedings of LASER 2014 Learning from Authoritative Security Experiment Results, Oct. 2014.

Lee, C., et al., A Validation Study of a Smartphone-Based Finger Tapping Application for Quantitative Assessment ofBradykinesia in Parkinson's Disease; published in PLOS One, DOI 10.1371/journal.pone.0158852, Jul. 2016.

Londrai, A., et al., A method to detect keystrokes using accelerometry to quantify typing rate and monitor neurodegenerative progression; published in Proceedings of the International Congress on Neurotechnology, Electronics and Informatics (Neurotechnix 2013), pp. 54-59, year 2013.

Matarazzo, M., et al., Remote Monitoring of Treatment Response in Parkinson's Disease: The Habit of Typing on a Computer; published in Movement Disorders, vol. 34, No. 10, year 2019.

Memedi, M., et al., Automatic and Objective Assessment of Alternating Tapping Performance in Parkinson's Disease; published in Sensors, 13(12): 16965-16984, Dec. 2013.

Ntracha, A., et al., Detection of Mild Cognitive Impairment Through Natural Language and Touchscreen TypingProcessing; published in Frontiers in Digital Health, DOI 10.3389/fdgth.2020.567158, Oct. 8, 2020.

Stringer, G., et al., Can you detect early dementia from an email? A proof of principle study of daily computer use to detect cognitive and functional decline; published in International Journal of Geriatric Psychology 33(7): 867-874. doi: 10.1002/gps.4863, year 2018.

Trager, M., et al., Anhythmokinesis is evident during unimanual not bimanual finger tapping in Parkinson's disease; published in Journal of Clinical Movement Disorders 2:8. doi: 10.1186/s40734-015-0019-2, year 2018.

Trewin, S., et al., Keyboard and mouse errors due to motor disabilities; published in International Journal of Human-Computer Studies, vol. 50, Issue 2, pp. 109-144, Feb. 1999.

Vizer, et al. Detecting Cognitive Impairment Using Keystroke and Linguistic Features of Typed Text: Toward an Adaptive Method for Continuous Monitoring of Cognitive Status; published in Proceedings of the Symposium of the Austrian HCI and Usability Engineering Group {USAB 2011), year 2011.

* cited by examiner

SYSTEMS AND METHODS FOR FACILITATING CUSTOMIZED ARTIFICIAL INTELLIGENCE OUTPUT BASED ON USER NEUROPERFORMANCE STATE

CROSS-REFERENCE TO RELATED APPLICATIONS

None

BACKGROUND

Field of the Art

This invention relates to the field of artificial intelligence output modification and neuroperformance assessment.

Discussion of the State of the Art

Artificial intelligence (AI) systems are often used to generate content in response to. However, these systems typically produce generic responses that are based on the general population associated with the training data, rather than being tailored to the individual user. For example, if a user asks an AI system a question or requests information on a particular topic, the system will provide a standard response that does not take into account the user's cognitive state or level of fatigue.

Attempts have been made to make AI systems more human-like in their responses. These efforts have primarily focused on modifying the output of the AI and the interaction layer with users, without considering the input. However, this approach does not solve the problem of personalization, as the responses are still not adapted to the user's specific needs or circumstances.

Other attempts to solve this problem have involved trying to make AI responses more user-specific. This has often involved asking the user to indicate their current neurostate, such as whether they are stressed or tired. However, this approach has several drawbacks. Firstly, it interrupts the flow of using AI systems, which are often used in the background without direct user interaction. To adapt the system in this way, the user would need to be prompted to provide these neuroperformance indicators. Secondly, users may not be aware of their current neurostate, or may not be able to accurately identify it.

Furthermore, a user's cognitive state or neurostate can change over time, varying throughout the day, week, or month. Current AI systems are not equipped to account for this dynamic characteristic and instead provide pre-determined responses. This lack of adaptability means that the responses provided by the AI system may not be relevant or helpful to the user at the time they are given.

In order to provide neurostate information to an AI system so that the AI system can generate custom user responses based on the neurostate, it is necessary to first quantify or otherwise establish a user's neurostate so that the AI system can generate a custom response based on that neurostate. One approach to determine a user's neurostate may comprise human interactions with devices. In modern computing, the ability to accurately track and analyze human interactions with devices presents significant challenges, particularly in the realms of security, user authentication, and personalized user experiences. These interactions, encompassing not only traditional keystrokes but also taps, touches, and swipes, generate vast amounts of data that, if processed effectively, can yield insights into user behavior, health, and even cognitive states.

Previous solutions in this domain have primarily focused on narrow aspects of this problem, such as keystroke dynamics for authentication purposes or basic touch interaction monitoring for analyzing user engagement. These approaches, while effective for their intended purposes, fail to capture the nuanced complexity of human-device interactions fully. For example, methods that rely solely on keystroke dynamics may not be applicable or sufficient in contexts where interactions go beyond text entry, such as gaming or navigating through a graphical user interface.

Moreover, existing solutions often treat these interactions in isolation, without considering the potential interconnectedness of different types of interactions or the broader context in which they occur. This isolation can lead to incomplete or skewed analyses, limiting the applicative value of the derived insights. Furthermore, many current methods are built with a focus on capturing and analyzing explicit interactions, such as specific commands or intentional gestures, without adequately considering passive or unintentional interactions that may also carry significant informational value.

Additionally, the focus on narrow or specific interaction types has led to solutions that lack generalizability or adaptability to new or evolving interaction modalities. As technology advances and the ways in which users interact with devices become more diverse and complex, these solutions become quickly outdated or require significant modification to remain relevant.

Solutions that do attempt to address a broader spectrum of interactions often do so at the cost of increased complexity, requiring substantial computational resources for data processing or intricate sensor setups to capture the requisite data. Such complexity can make these solutions impractical for use in everyday computing devices or for applications where real-time processing is essential.

In light of these challenges, there is a clear need for a more holistic approach to tracking and analyzing the full range of human-device interactions. Such an approach would need to account not only for the diversity of interaction types but also for the contextual and possibly interconnected nature of these interactions. Additionally, it should be adaptable to new technologies and interaction modalities, scalable to handle vast amounts of interaction data efficiently, and practical for integration into a wide range of computing devices and applications.

As AI becomes more embedded in everyday applications—from productivity tools and educational platforms to e-commerce and intelligent assistants—there is a growing need for systems that not only respond to user input, but perceive and adapt to user state. The invention introduced here pioneers this shift, positioning perceptive AI as a foundational paradigm that allows digital systems to become attuned, context-aware interfaces—optimizing user experience, minimizing friction, and enabling truly personalized interactions.

SUMMARY

The invention presented here introduces a comprehensive method for capturing and analyzing the full range of human-device interactions, significantly enhancing the capabilities over traditional keystroke dynamics or basic touch interaction monitoring. Unlike prior art that narrowly focuses on explicit user inputs or offers limited insight into the nuanced complexity of such interactions, this method employs a sophisticated approach to understand and interpret a wide array of gestures, including but not limited to taps, touches, swipes, and other forms of engagement with computing devices.

This invention solves the identified problems by offering a system that captures not just the traditional keystrokes but extends its capabilities to a richer set of inputs, thereby providing a much broader understanding of user behavior. It operates on the premise that every interaction, whether deliberate or unintentional, carries valuable information that, when properly analyzed, can yield insights into the user's cognitive state, intentions, and even health conditions. By doing so, it bridges the gap left by previous solutions that were either too focused on specific types of interactions or required complex setups to capture a wider range of inputs.

The improvement offered by this invention over existing technologies lies in its ability to seamlessly integrate into various computing environments without the need for specialized hardware, making it inherently more adaptable and easier to deploy. Additionally, by processing data from a wide spectrum of interactions, it avoids the pitfalls of systems that only consider isolated inputs, thereby offering a more holistic view of human-device engagement. Moreover, the methodology is designed to be scalable, ensuring that it can handle vast amounts of data efficiently, making it suitable for real-time applications and offering significant improvements in areas such as personalized user experiences, security, and health monitoring.

By expanding the focus from keystroke dynamics to encompass a broader range of human-device interactions, this invention provides a more versatile and powerful tool for understanding and enhancing user interaction. Furthermore, the ability to interpret a wide variety of inputs as part of a cohesive system represents a significant leap forward in this technology domain, offering flexibility and precision that surpasses the capabilities of existing solutions.

The invention described here involves capturing, quantifying, analyzing, and reducing user-device interaction data into valuable metrics that can inform AI systems and influence their decision making and responses. This process involves generating a neuroprofile from the data of human-device interactions. This data is then translated into cognitive, motor, and behavioral domains, and further divided into subdomains such as executive function, nonverbal memory, and verbal memory. This detailed information is then used to understand neural performance.

The invention relies on user-device interaction, which is a common method of interaction with AI systems. It characterizes a user's profile in a comprehensive way, taking into account not just current mood or voice tone, but also neuromotor and neurocognitive components that are essential for adapting content. The focus of the invention is on personalizing the feedback from the AI, rather than making the AI more human-like. This new layer of interaction is seen as a form of deep nonverbal communication, capturing aspects of user behavior that are not explicitly expressed in human-to-human interaction and/or aspects of user behavior which a user may not be readily aware of.

The invention addresses the challenges of prior solutions by focusing on inputs through device interaction. It captures and analyzes data in a way that can inform AI systems and influence their responses. The invention provides a dynamic, constantly updating understanding of a user's neural profile, in contrast to the static snapshots provided by current voice and video approaches. Furthermore, the invention is less susceptible to being fooled by users masking their true feelings, as can happen with voice and video.

The invention takes timing data from user-device interactions (e.g. finger-device interactions) and translates it into cognitive, motor, and behavioral domains. It then further divides these domains into subdomains such as executive function, nonverbal memory, and verbal memory. This detailed information is then used to understand neural performance. This process creates a layer of nonverbal communication with the machine, enhancing the level of personalization.

The benefits of the invention include a more personalized interaction with AI systems, a more comprehensive understanding of a user's cognitive state, and a less interruptive method of gathering user data. The invention also provides a more dynamic and continually updating understanding of a user's neural profile, in contrast to the static snapshots provided by current approaches. Moreover, the invention allows for determination or estimation of temporal trends at various time intervals (e.g. hourly, daily, weekly, etc.) that inform the AI in generating custom responses adapted to predicted future mental states of a given user.

This system establishes a class of AI interfaces—perceptive AI systems—that adapt dynamically to users' evolving neurobehavioral state. Unlike traditional personalization methods that rely on static profiles or manual inputs, the invention enables real-time, implicit modulation of AI behavior based on continuously updated neuroperformance data. This perceptive layer transforms assistants into non-intrusive, user-aligned listeners that mediate between the user and the digital world—shaping navigation, content, and actions across domains without explicit commands.

These perceptive adaptations may be applied across a wide range of domains such as the following:

- Productivity and wellness tools that adapt calendars, task suggestions, and alerts based on focus, motivation, and energy levels;
- Educational platforms that adjust difficulty, modality, and pacing in real time based on cognitive fatigue and attention rhythms;
- E-commerce and advertising systems that dynamically tailor content, timing, and framing of recommendations or promotions based on moment-to-moment user receptiveness;
- Digital interfaces including web page layouts, UI/UX components, and interaction flows that reconfigure responsively to user states, improving clarity and reducing cognitive load; and
- User-owned AI systems and assistants that serve as perceptual extensions of the user-non-intrusive listeners that adaptively mediate interactions across apps, browsers, content, and communications, enhancing alignment without requiring explicit input.

The techniques disclosed herein not only improve the feedback generated by AI systems, but improve AI responses such that they are custom tailored to a neurobehavioral state of a user thereby allowing the AI to better produce output adapted to dynamically changing user neurostates.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
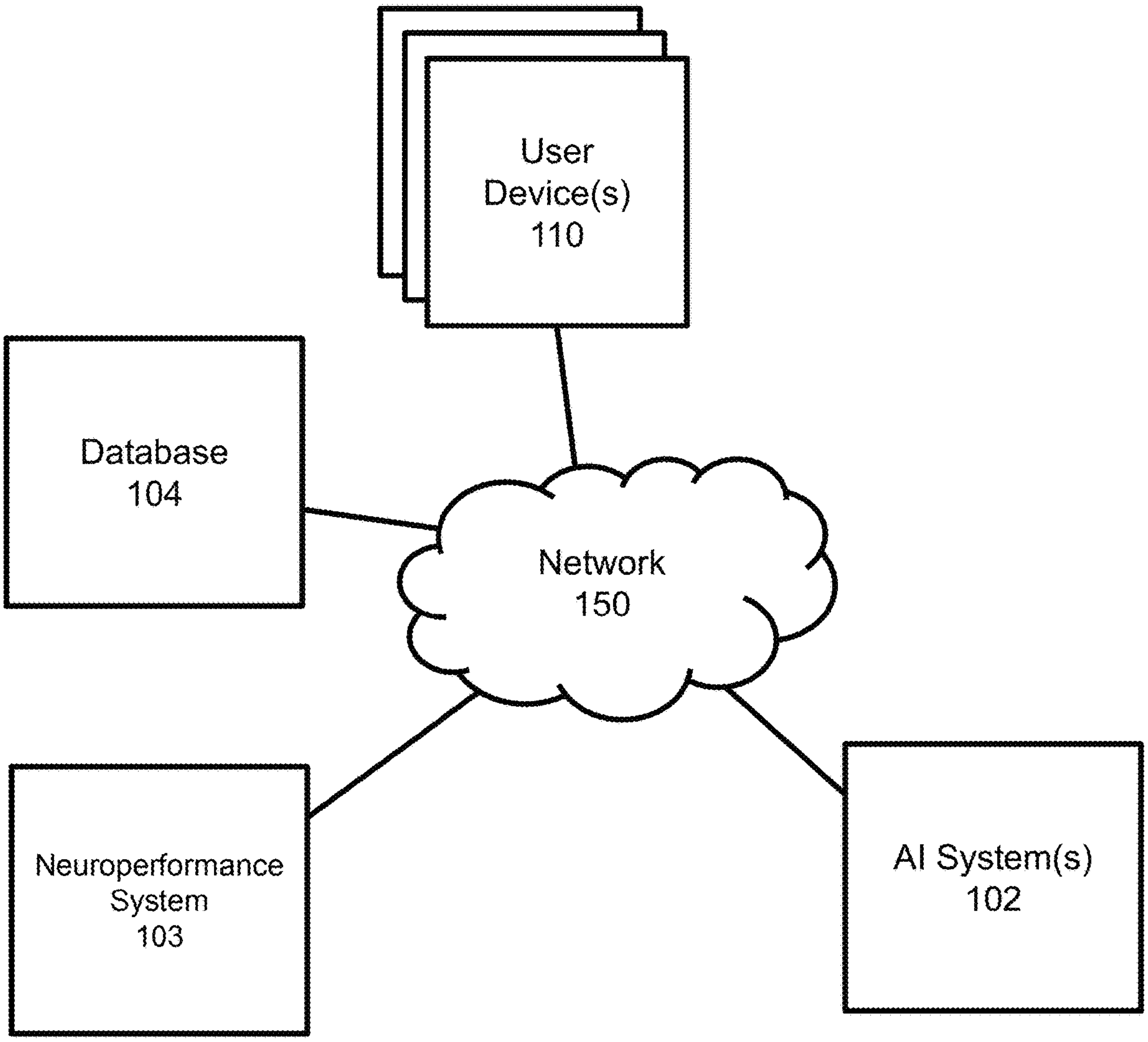
FIG. 1 illustrates a network architecture for systems and methods for facilitating customized artificial intelligence output based on user neuroperformance state in accordance with an exemplary embodiment of the invention.

The present invention relates to a system and method for capturing, quantifying, analyzing, and reducing user-device interaction data into valuable and informative metrics that can inform artificial intelligence (AI) systems and influence their decision-making and responses. The invention involves generating a neuroprofile from user-device interaction by collecting timing data from finger-device interactions and translating that data to the domain level of cognitive, motor, and behavioral functions. The system further extrapolates the data to separate cognitive functions into sub-domains such as executive function, nonverbal memory, and verbal memory, ultimately using the information to determine neural performance.

The invention relies on user-device interaction, which is the most common input users employ to interact with AI systems. The system characterizes a user profile in a broad manner, incorporating not only the user's current mood and voice tone but also the neuromotor and neurocognitive components that are beneficial for adapting content. The primary focus of the invention is on personalizing feedback and actions received from the AI rather than making the AI more human-like. This new layer in the interaction creates a deeper form of nonverbal communication, measuring aspects that humans do not explicitly express in human-to-human interactions. These aspects can be determined from a user-device interaction-based neuroprofile.

By capturing and analyzing user-device interaction data, the invention enables AI systems to better understand and respond to users' cognitive, motor, and behavioral states. The generated neuroprofile provides a comprehensive view of the user's neural performance, allowing the AI to adapt its content, feedback, and actions accordingly. This personalized approach enhances the user experience and improves the effectiveness of the AI system in assisting and interacting with the user.

The invention's unique approach to nonverbal communication through user-device interaction data offers a novel means of enhancing AI systems' understanding of users and their needs. By incorporating this deeper level of communication, the invention enables AI systems to provide more personalized and effective responses, ultimately improving the overall user experience and the AI's ability to assist and interact with users.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of systems and methods for facilitating customized artificial intelligence output based on user neuroperformance state according to one embodiment. FIG. 1 illustrates an exemplary embodiment of a system according to one embodiment. The system includes user devices 110, neuroperformance system 103, AI system(s) 102, database 104, and a network 150 over which the various systems communicate and interact. As a general overview, neuroperformance system obtains data associated with user-device interactions (user interactions with a user device) for a given user, determines neuroprofile characteristics for the user, and provides neuroprofile information to AI system(s) for use by the AI system(s) in generating custom responses for each user based on their neuroprofile.

The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

In one embodiment, user devices 110 are configured to obtain data associated with user-device interactions. These user devices may include, but are not limited to, smartphones, tablets, laptops, desktop computers, wearable devices, or any other computing device capable of capturing user input. The user devices 110 may obtain signals associated with user interactions with the device, such as keystrokes, mouse clicks, touch events, swipe gestures, or any other form of input that a user may provide while interacting with the device. The user devices 110 may be equipped with various sensors, such as accelerometers, gyroscopes, touch screens, or pressure sensors, to capture these user interaction signals.

Once the user devices 110 have obtained the user interaction signals, they may process the signals to convert them into user device interaction metrics. These metrics may include, but are not limited to, typing speed, typing accuracy, touch pressure, swipe speed, swipe direction, or any other quantifiable measure of user interaction with the device. The user devices 110 may utilize various algorithms, such as pattern recognition, signal processing, or machine learning techniques, to convert the raw user interaction signals into meaningful interaction metrics.

Alternatively or additionally, the user devices 110 may provide the raw user interaction signals directly to the neuroperformance system 103 for further processing. In this case, the neuroperformance system may be responsible for converting the raw signals into user device interaction metrics. The user devices 110 may transmit the raw signals to the neuroperformance system using various communication protocols, such as HTTP, HTTPS, TCP/IP, or any other suitable protocol, over a network connection, such as the internet or a local area network.

In another alternative, the user devices 110 may perform some initial processing of the user interaction signals to generate intermediate user device interaction metrics, which are then provided to the neuroperformance system for further processing. This approach may help to reduce the amount of data that needs to be transmitted over the network, while still allowing the neuroperformance system to perform more advanced analysis on the user device interaction metrics.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), a background service operating below the application level, and/or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

In one embodiment, the neuroperformance system 103 is designed to obtain user device interaction information and/or neuroprofile information (e.g. from a database, generated/stored on a user device, etc.). The user device interaction information can be any data generated from the user's interaction with a device, such as timing data from finger-device interactions. This data can provide insights into the user's cognitive, motor, and behavioral domains, and can be further divided into subdomains such as executive function, nonverbal memory, and verbal memory.

The neuroperformance system 103 processes this user device interaction information to generate a neuroprofile. This neuroprofile is a comprehensive representation of the user's cognitive state, including neuromotor and neurocognitive components. It provides a detailed understanding of the user's neural performance, which can be used to inform AI systems and influence their decision making and responses.

In addition to generating neuroprofiles, the neuroperformance system 103 can also obtain neuroprofile information from a database of previously recorded or stored neuroprofiles for a user. This allows the system to compare current user device interaction information with past data, providing a dynamic, constantly updating understanding of the user's neural profile.

The neuroperformance system 103 can provide neuroprofile information to an AI system as part of an interaction with the AI system. This could be in the form of a prompt header, for example. By providing this information to the AI system, the neuroperformance system 103 enables the AI system to adapt its responses based on the user's current cognitive state, enhancing the level of personalization in the interaction.

There are alternatives to the neuroperformance system 103. For example, other systems could use different types of user interaction data, such as voice or video, to generate a neuroprofile. However, these systems may be more susceptible to being fooled by users masking their true feelings. Another alternative could involve the user manually inputting their current neurostate, but this could interrupt the flow of using AI systems and may not be as accurate or comprehensive as the data obtained through user-device interaction.

In one embodiment, AI system(s) 102 comprise a wide range of artificial intelligence systems and/or models that are capable of processing input associated with a user. These AI systems may include, but are not limited to, machine learning models, deep learning networks, natural language processing engines, computer vision systems, or any other type of AI system that can analyze and interpret user-related data. The AI system(s) 102 may be designed to handle various types of input, such as text, speech, images, video, or any other form of data that can be associated with a user.

The primary function of the AI system(s) 102 is to process user-related input and generate appropriate outputs based on the input and the specific goals of the AI system. For example, an AI system designed for sentiment analysis may take a user's text input and determine the overall emotional tone of the text, while an AI system designed for image recognition may analyze a user's profile picture to identify key features or objects within the image.

The AI system(s) 102 may utilize various algorithms and techniques to process user input and generate outputs. These may include, but are not limited to, supervised learning algorithms, unsupervised learning algorithms, reinforcement learning algorithms, or any combination thereof. The specific algorithms and techniques used may depend on the type of input being processed and the desired output.

In some cases, the AI system(s) 102 may comprise generative AI systems, which are designed to create new content based on the input they receive. Generative AI systems may include, but are not limited to, language models that can generate human-like text, image generation models that can create new images based on textual descriptions, or music generation models that can compose novel musical pieces based on existing styles or genres.

Alternatively, the AI system(s) 102 may include discriminative AI systems, which are designed to classify or categorize input data into predefined categories. Discriminative AI systems may include, but are not limited to, image classification models that can identify objects or scenes within an image, sentiment analysis models that can classify text as positive, negative, or neutral, or speech recognition models that can transcribe spoken words into written text.

The AI system(s) 102 may also incorporate hybrid approaches that combine both generative and discriminative techniques. For example, a generative adversarial network (GAN) may use a generative model to create new content, while a discriminative model simultaneously attempts to distinguish between real and generated content, providing feedback to the generative model to improve its output quality.

The AI system(s) 102 may incorporate decision making AI systems and/or algorithms operable to autonomously manage tasks including, but not limited to at least one of scheduling, resource allocation, and action execution based on contextual data.

In one embodiment, database 104 serves as a central repository for storing information related to neuroperformance and neuroprofiles. The database may be designed to store structured or unstructured data, depending on the specific requirements of the system and the nature of the information being stored. The database 104 may be implemented using various database management systems (DBMS), such as relational databases (e.g., MySQL, PostgreSQL), NoSQL databases (e.g., MongoDB, Cassandra), or any other suitable data storage solution.

The primary function of the database 104 is to provide a persistent and organized storage space for neuroperformance and neuroprofile data. This data may include, but is not limited to, raw user-device interaction data, processed interaction metrics, user neuroprofiles, and any other relevant information that is generated or collected by the system. The database 104 may also store metadata associated with the stored data, such as timestamps, data sources, or data quality indicators.

The database 104 may be accessed by other components of the system, such as the neuroperformance system or the AI system(s), to retrieve or store data as needed. The database may support various data manipulation operations, such as inserting new records, updating existing records, deleting records, or querying the database to retrieve specific subsets of data based on certain criteria.

To ensure data integrity and consistency, the database 104 may implement various data validation and error-checking mechanisms. These may include, but are not limited to, data type validation, constraint enforcement (e.g., unique keys, foreign keys), or data consistency checks. The database may also support transactions to ensure that data modifications are atomic, consistent, isolated, and durable (ACID properties).

Alternatively, the database 104 may be implemented using a distributed database architecture, where data is spread across multiple nodes or servers. Distributed databases may provide benefits such as increased scalability, fault tolerance, and performance, especially when dealing with large volumes of data or high-throughput workloads. Examples of distributed database systems include Apache Cassandra, Apache HBase, or Google Cloud Spanner.

Another alternative approach is to use a cloud-based database service, such as Amazon Web Services (AWS) DynamoDB, Google Cloud Datastore, or Microsoft Azure Cosmos DB. Cloud-based databases offer advantages such as automatic scaling, high availability, and reduced maintenance overhead, as the cloud provider manages the underlying infrastructure and database management tasks.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
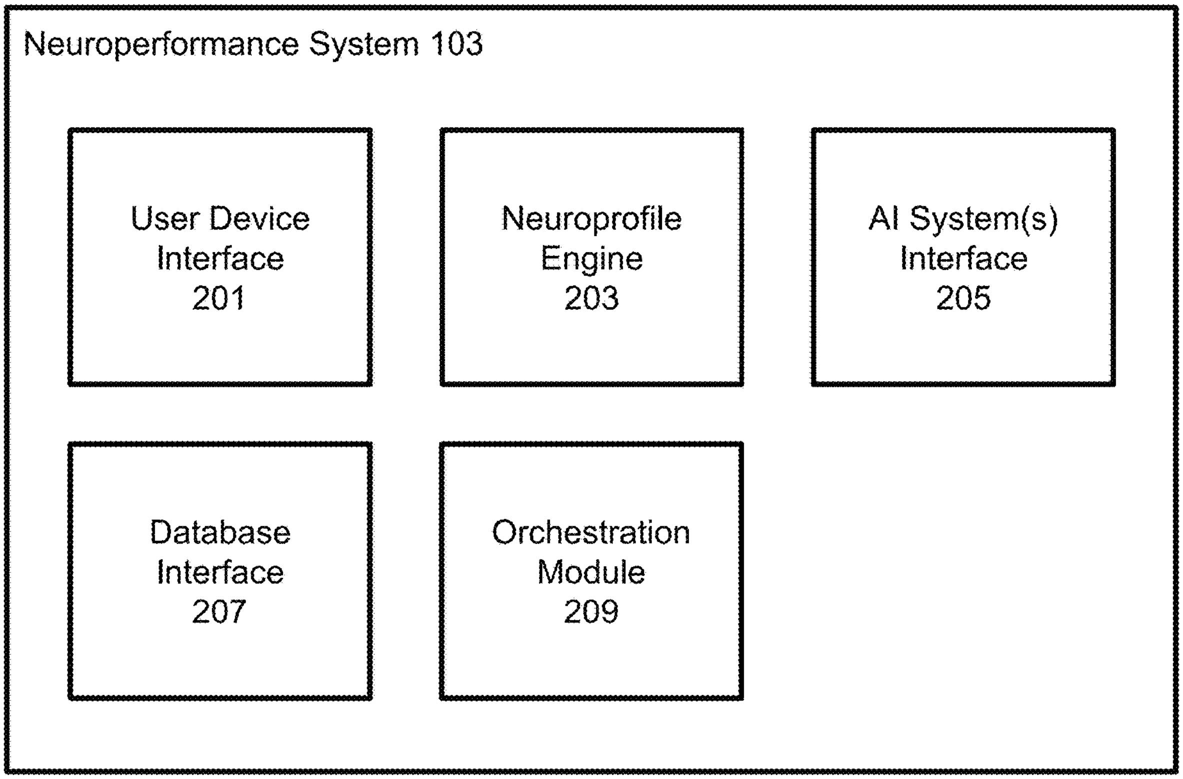
FIG. 2A illustrates a system architecture for systems and methods for facilitating customized artificial intelligence output based on user neuroperformance state in accordance with an exemplary embodiment of the present invention.

FIG. 2A illustrates an exemplary embodiment of the neuroperformance system 103 in accordance with an embodiment of the invention. Neuroperformance system processes user-device interaction information and generates neuroprofile information for use in interacting with AI systems. Neuroperformance system comprises user device interface 201, neuroprofile engine 203, AI system(s) interface 205 and database interface 207. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

In one embodiment, user device interface 201 is a component of the neuroperformance system that is responsible for communicating with user devices to obtain user-device interaction data, also known as human-machine interface data. The user device interface 201 may be implemented as a software module, a hardware component, or a combination of both, depending on the specific requirements of the system.

The primary function of the user device interface 201 is to establish a communication channel between the neuroperformance system and the user devices, enabling the system to receive data related to user interactions with their devices. This data may include various types of information, such as raw signal data, processed interaction metrics, or audio and video data associated with user-device interactions.

To obtain raw signal data, the user device interface 201 may communicate with the user devices using various communication protocols, such as Bluetooth, Wi-Fi, USB, or any other suitable protocol that allows the transfer of raw sensor data from the user devices to the neuroperformance system. Raw signal data may include, but is not limited to, accelerometer readings, gyroscope measurements, touch sensor data, or any other low-level sensor data that captures user interactions with their devices.

In some cases, the user device interface 201 may receive processed signal data from the user devices, which has already been converted into interaction metrics. Interaction metrics may include, but are not limited to, the number of touches, taps, swipes, pinches, or scrolls performed by the user on their device. The user devices may preprocess the raw signal data to extract these interaction metrics before sending them to the neuroperformance system via the user device interface 201.

Additionally, the user device interface 201 may be capable of obtaining audio and video data associated with user-device interactions. For example, the user device interface 201 may receive audio recordings of the user's voice commands or video recordings of the user's facial expressions while interacting with their devices. This audio and video data may be captured by the user devices' built-in microphones and cameras and transmitted to the neuroperformance system through the user device interface 201.

To facilitate the transfer of user-device interaction data, the user device interface 201 may employ various data transfer mechanisms, such as APIs (Application Programming Interfaces), SDKs (Software Development Kits), or web sockets. These mechanisms allow the user device interface 201 to establish a secure and efficient communication channel between the neuroperformance system and the user devices.

Alternatively, the user device interface 201 may be implemented as a web-based interface that allows user devices to upload user-device interaction data to the neuroperformance system via a web browser. In this case, the user devices may collect and preprocess the interaction data locally and then send it to the neuroperformance system through a web-based upload interface provided by the user device interface 201.

Another alternative approach is to use at least one of a mobile application, a desktop application and a background service that runs on the user devices and communicates with the user device interface 201. The mobile app or desktop application may collect user-device interaction data in the background while the user interacts with their device and periodically send the collected data to the neuroperformance system via the user device interface 201.

In one embodiment, neuroprofile engine 203 is a component of the neuroperformance system that is responsible for processing human/user-device interaction data and generating a comprehensive neuroprofile for each user. The neuroprofile engine 203 may be implemented as a software module, a hardware component, or a combination of both, depending on the specific requirements of the system.

The primary function of the neuroprofile engine 203 is to analyze the user-device interaction data obtained by the user device interface 201 and extract meaningful insights about the user's neuroperformance across various categories. These categories may include motor skills, cognitive skills, emotional/behavioral factors, daily peak performance times, current neuroperformance state, recent changes in neuroperformance, and daily, weekly, or seasonal patterns.

To generate a neuroprofile, the neuroprofile engine 203 may employ various data processing techniques, such as signal processing, pattern recognition, machine learning, or statistical analysis. The specific techniques used may depend on the type and format of the user-device interaction data being processed.

For example, to assess motor skills, the neuroprofile engine 203 may analyze the user's agility, reflexes, coordination, strength, balance, and dexterity based on the user's touch interactions, swipe patterns, or typing speed and accuracy. The neuroprofile engine 203 may use algorithms such as dynamic time warping, hidden Markov models, or support vector machines to identify patterns and classify the user's motor skills.

To evaluate cognitive skills, the neuroprofile engine 203 may focus on aspects such as executive function, memory, visuospatial skills, attention, perception, and language. The neuroprofile engine 203 may analyze the user's typing errors, response times, or navigation patterns to infer their cognitive abilities. Machine learning techniques, such as neural networks, decision trees, or Bayesian networks, may be employed to model and predict the user's cognitive skills based on the interaction data.

Emotional and behavioral factors, such as fatigue, mood, stress, motivation, social interaction, and impulse control, may be assessed by the neuroprofile engine 203 using a combination of interaction data and additional data sources, such as audio and video recordings of the user's facial expressions or voice tone. The neuroprofile engine 203 may apply sentiment analysis, emotion recognition, or stress detection algorithms to identify the user's emotional state and behavioral patterns.

To determine daily peak performance times and current neuroperformance state, the neuroprofile engine 203 may analyze the user's interaction data over time and identify periods of high and low performance. The neuroprofile engine 203 may use time series analysis techniques, such as moving averages, exponential smoothing, or autoregressive models, to detect trends and patterns in the user's neuroperformance.

The neuroprofile engine 203 may also track recent changes in the user's neuroperformance and identify daily, weekly, or seasonal patterns. By comparing the user's current neuroprofile with historical data, the neuroprofile engine 203 can detect significant changes or deviations from the user's typical neuroperformance patterns. Anomaly detection algorithms, such as k-nearest neighbors, local outlier factor, or isolation forests, may be used to identify unusual or abnormal neuroperformance states.

Alternatively, the neuroprofile engine 203 may use rule-based systems or expert systems to generate neuroprofiles based on predefined rules or heuristics. These rules may be derived from domain knowledge or empirical studies on human neuroperformance and may be used to classify or categorize the user's neuroperformance based on their interaction data.

Another approach may comprise sub-domain modeling using a two-step source transformation plus domain adaptation. Another alternative approach is to use unsupervised learning techniques, such as clustering or dimensionality reduction, to discover inherent patterns or structures in the user's interaction data. These techniques may help identify distinct neuroperformance profiles or subgroups among users without relying on predefined categories or labels.

In one embodiment, the AI system(s) interface is a component of the neuroperformance system that facilitates the exchange of neuroprofile information between the neuroperformance system and one or more AI systems. The AI system(s) interface may be implemented as a software module, an API (Application Programming Interface), or a communication protocol, depending on the specific requirements of the system and the AI systems it interacts with.

The primary function of the AI system(s) interface is to provide neuroprofile information to the connected AI systems in response to various triggers. These triggers can be classified as either active or passive, depending on the nature of the event that initiates the interaction between the neuroperformance system and the AI systems.

Active triggers are typically user-initiated actions that directly result in an interaction with an AI system. For example, when a user performs a search query, the AI system(s) interface may provide the user's current neuroprofile information to the AI-powered search engine, enabling it to generate personalized search results based on the user's cognitive state, emotional state, or other relevant factors.

Passive triggers, on the other hand, are events or conditions that are not directly initiated by the user but still prompt the AI system(s) interface to provide neuroprofile information to the AI systems. These triggers may be based on the user's neuroprofile itself, such as when the neuroperformance system determines that the user is in a specific cognitive or emotional state at a particular time of day, week, or month. For instance, if the neuroperformance system detects that a user is typically in a state of high focus and creativity during weekday mornings, the AI system(s) interface may proactively provide this information to an AI-powered content recommendation system, which can then suggest relevant articles, videos, or other resources that align with the user's current neuroprofile.

To facilitate the exchange of neuroprofile information, the AI system(s) interface may employ various communication protocols, such as HTTP (Hypertext Transfer Protocol), REST (Representational State Transfer), or WebSocket. These protocols allow the AI system(s) interface to send neuroprofile data to the AI systems in a structured and standardized format, such as JSON (JavaScript Object Notation) or XML (eXtensible Markup Language).

In some embodiments, the AI system(s) interface may also be implemented or extended using a Model Context Protocol (MCP). The MCP defines a structured schema and exchange mechanism for delivering perceptive state information—derived from a user's neuroprofile—to external AI systems, such as large language models or recommendation engines. This enables lightweight integration without deep system coupling. An MCP server may be deployed as a standalone module that publishes relevant perceptual context to subscribing clients or downstream models in real time.

The AI system(s) interface may implement security measures to ensure the confidentiality and integrity of the neuroprofile information being transmitted. This may include encryption techniques, such as SSL/TLS (Secure Sockets Layer/Transport Layer Security), to protect the data in transit, as well as authentication and/or authorization mechanisms to verify the identity and/or permissions of the AI systems receiving the neuroprofile information.

Alternatively, the AI system(s) interface may be implemented as a middleware layer that sits between the neuroperformance system and the AI systems. In this case, the middleware layer would be responsible for managing the flow of neuroprofile information, handling data transformations, and ensuring compatibility between the neuroperformance system and the various AI systems it interacts with.

Another alternative approach is to use a publish-subscribe model, where the neuroperformance system acts as a publisher of neuroprofile information, and the AI systems subscribe to specific types of neuroprofile data that are relevant to their functionality. In this model, the AI system(s) interface would be responsible for managing the subscription process, routing neuroprofile information to the appropriate AI systems, and handling any necessary data transformations or filtering.

In one embodiment, the database interface 207 is a component of the neuroperformance system that enables the system to interact with a database for storing and retrieving neuroprofile information. The database interface 207 may be implemented as a software module, a library, or an API (Application Programming Interface), depending on the specific requirements of the system and the database technology being used.

The primary function of the database interface 207 is twofold: first, it provides neuroprofile information to the database for persistent storage, allowing the neuroperformance system to maintain a historical record of users' neuroprofiles over time. Second, it retrieves previously stored neuroprofile information from the database when needed for further processing or analysis by other components of the neuroperformance system.

To store neuroprofile information, the database interface 207 may receive neuroprofile data from the neuroprofile engine 203 or other components of the neuroperformance system. The database interface 207 then converts this data into a format suitable for storage in the database, such as SQL (Structured Query Language) statements or NoSQL (Not Only SQL) document representations. The specific data format and storage mechanism may vary depending on the type of database being used, such as relational databases (e.g., MySQL, PostgreSQL) or NoSQL databases (e.g., MongoDB, Cassandra).

When retrieving neuroprofile information from the database, the database interface 207 receives requests from other components of the neuroperformance system, such as the AI system(s) interface 205 or data analysis modules. These requests may include specific query parameters or criteria to filter and select the relevant neuroprofile data. The database interface 207 then translates these requests into the appropriate database query language (e.g., SQL) and executes the queries on the database. The retrieved neuroprofile data is then converted back into a format that can be consumed by the requesting component, such as JSON (JavaScript Object Notation) or XML (eXtensible Markup Language).

To optimize the performance of database operations, the database interface 207 may implement various caching mechanisms. For example, frequently accessed neuroprofile information can be cached in memory to reduce the number of database queries and improve response times. The database interface 207 may also employ connection pooling techniques to manage and reuse database connections efficiently, minimizing the overhead of establishing new connections for each database operation.

The database interface 207 may also incorporate security measures to protect the sensitive neuroprofile information stored in the database. This may include implementing authentication and authorization mechanisms to ensure that only authorized components of the neuroperformance system can access and modify the neuroprofile data. Additionally, the database interface 207 may employ encryption techniques, such as AES (Advanced Encryption Standard) or RSA (Rivest-Shamir-Adleman), to secure the neuroprofile data at rest and in transit.

Alternatively, the database interface 207 may be implemented using an ORM (Object-Relational Mapping) framework, which provides a higher-level abstraction layer for interacting with the database. ORM frameworks, such as Hibernate (for Java) or SQLAlchemy (for Python), allow developers to work with database records as objects, reducing the need for writing raw SQL queries and simplifying the database access code.

Another alternative approach is to use a distributed database system, such as Apache Cassandra or Google Cloud Spanner, which can scale horizontally to handle large volumes of neuroprofile data. In this case, the database interface 207 would need to be adapted to work with the specific distributed database API and handle data partitioning, replication, and consistency across multiple database nodes.

The orchestration module 209 is operable to coordinate interaction with the AI system(s) to generate AI responses tailored to a user's neuroprofile. In one aspect, the orchestration module 209 is operable to act as a decision-making intermediary that applies conditional logic to link specific neuroprofile states (which represent the user's cognitive or emotional state) to AI responses. The orchestration module 209 may employ one or more conditional logic techniques, such as "if-then-else" structure, which can range from simple binary conditions to more elaborate decision trees that consider a wide range of neuroprofile states. The orchestration module 209 may coordinate interaction with the AI system(s) via API calls. The orchestration module 209 may select responses based on predefined rules or may instruct the AI system to generate responses based on predefined rules. The orchestration module 209 may statically adjust responses or content communicated to a user (via a user device) by altering factors to better match the identified neuroprofile state, including, but not limited to, altering at least one of length, complexity, and timing to better match the neuroprofile state.

An example implementation of the orchestration module 209 comprises a user accessing a learning application after a day at work, feeling tired and distracted. The orchestration module 209 may obtain information regarding the user's neuroprofile (e.g. from the neuroprofile engine 203) indicating low cognitive energy and high distraction levels. The orchestration model 209 applies conditional logic and/or rules to identify or select learning content appropriate for the neuroprofile state. For example, if cognitive energy is low and distraction is high, the orchestration module 209 may select or request easy, short learning exercises, with frequent breaks. The orchestration module may make an API call to an AI model requesting a pre-configured set of exercises for low energy levels. The orchestration module 209 may communicate, to the learning application (via a user device), short engaging exercises (e.g., simple vocabulary matching) and suggests taking breaks between exercises. In this way, the content provided/displayed is straightforward, with reduced complexity, and the timing is paced to avoid overwhelming the user, given the obtained neuroprofile information.

In one aspect, the orchestration module 209 is operable to dynamically interact with AI system(s) and/or models. The orchestration module 209 may fine-tune a foundational model's hyperparameters in real-time, responding to immediate feedback from user interactions. This may comprise adjusting parameters, including, but not limited to at least one of learning rate, dropout rates, and layer weights to optimize performance. The orchestration module 209 may continuously analyze performance and provide feedback that informs AI system/model adjustments. In this way, AI responses maintain their relevancy and can be optimized for user engagement over time as a user's neurostate changes (e.g. their neuroprofile indicates a change).

An example implementation of the orchestration module 209 comprises a user engaging with a virtual fitness coach seeking an exercise plan tailored to their current physical and mental state. The orchestration module 209 may obtain information regarding the user's neuroprofile (e.g. from the neuroprofile engine 203) indicating moderate physical fatigue, but high motivation. The orchestration module 209 may dynamically adjust hyperparameters associated with the AI system and/or model in real-time based on dynamic neuroprofile information. The orchestration module 209 may increase a learning rate associated with the AI system/model to quickly adapt the workout plan based on real-time feedback. The orchestration module 209 may adjust a dropout rate associated with the AI system/model to maintain a balance between challenge and achievability. The orchestration module 209 may continuously monitor user information throughout the exercise session (e.g. via data obtained via a wearable associated with the user, via user input, etc.) and dynamically adjust the exercise plan to maintain a workout suitable for the user's neurostate. For example, if the user is showing signs of increasing fatigue (e.g. slower heart rate recovery), the orchestration module 209 may coordinate with the AI system to adjust the workout intensity. In this way, the exercise content provided may comprise a plan that begins with moderate exercises to match the user's motivation but adjusts the intensity dynamically if the user's fatigue increases, ensuring they stay engaged and achieve their goals.

In one aspect, the orchestration module 209 is operable to dynamically interact with AI system(s) and/or models in a manner enabling AI systems and/or models to evolve their behavior over time. This may comprise employing machine learning techniques (e.g. reinforcement learning) to enable the AI systems/models to adjust over time based on long-term neuroprofile data and/or user interaction data. The reinforcement learning techniques may employ methodologies such as, but not limited to, Q-learning and/or policy gradient approaches to refine AI response strategies. A reward function may be employed with a focus on certain metrics (e.g. user engagement), to continuously improve the AI output. This reinforcement learning approach is merely exemplary and other machine learning techniques may be used as would be apparent to one of ordinary skill in the art without departing from the scope of the invention. In this way, the orchestration module 209 is operable to facilitate evolution of the AI models beyond fine-tuning of hyperparameters such that the AI model(s) incorporates trends in user data (e.g. long-term trends) aiming to improve the AI interaction quality and output as a function of neurostate or neuroprofile factors.

An example implementation of the orchestration module 209 comprises a user routinely interacting with a virtual mental health assistant or application to manage stress and anxiety. The orchestration module 209 may obtain information regarding the user's neuroprofile (e.g. from the neuroprofile engine 203) indicating recurring patterns of stress, particularly in the evening after work. The orchestration module 209 may employ reinforcement learning to optimize the application or assistant's responses over time. Q-learning may be used to determine the best responses based on previous interactions. Different strategies may be explored with the AI model, such as suggesting mindfulness exercises, breathing techniques, and/or journaling prompts. The system may maximize a reward function based on user feedback (e.g., self-reported stress reduction, engagement time, or positive interaction outcomes). Over time, aided by the orchestration module 209, the assistant evolves its approach, shifting from generic stress management techniques to highly personalized strategies that have proven effective for the user (e.g., suggesting a specific breathing exercise that consistently reduces the user's stress levels). In this way, the orchestration module 209 is operable to facilitate the virtual assistant or application to offer more personalized and user-specific effective stress management techniques, wherein the virtual assistant or application is instructed to evolve its recommendations based on long-term user data and engagement trends.

FIG. 2A illustrates an exemplary system architecture in accordance with an exemplary embodiment of the present invention. The system comprises trigger layer 221, neurostate layer 222, backend 223, action layer 224, presentation layer 225, and local storage 226. The various components described herein are exemplary and for illustration purposes only and any combination or subcombination of the various components may be used as would be apparent to one of ordinary skill in the art. Other systems, interfaces, modules, layers, engines, databases, and the like, may be used, as would be readily understood by a person of ordinary skill in the art, without departing from the scope of the invention. Any system, interface, module, layer, engine, database, and the like may be divided into a plurality of such elements for achieving the same function without departing from the scope of the invention. Any system, interface, module, layer, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

In one embodiment, the system architecture is modularly layered to support real-time responsiveness and fallback mechanisms. This layered structure allows perceptive AI systems to function as real-time mediators between user state and digital content, adjusting user interface/user experience (UI/UX), notification logic, task prioritization, and more based on implicit user feedback.

The trigger layer 221 is a layer that generally listens for user events (e.g. highlights, pauses, user inputs, etc.) and/or context. The trigger layer may listen for user events by monitoring user input. The trigger layer may determine context by analyzing user inputs to identify contextual information pertaining to the input. The trigger layer 221 is operable to transmit tasks and/or updates, as determined in response to user events and/or context, to local storage 226. Trigger layer 221 may monitor neurostate layer 222 to identify changes in neurostate for a user which may be used by the trigger layer to instruct performance at the action layer.

The neurostate layer 222 is a layer that generally monitors (periodically or continuously) and evaluates the user's neuroperformance state. The neurostate layer may receive a user's neuroperformance state which has been determined as discussed in association with FIG. 2A and/or FIG. 3. The neurostate layer may compare neuroperformance signals against one or more configurable thresholds to determine a deviation or shift from a previous neurostate to a new neurostate. Neurostate layer 222 may inform action layer based on an evaluation of the neurostate, changes in neurostate, and/or comparison of neurostate signals against thresholds.

The backend 223 is generally operable to analyze neurostate in real-time. As more data becomes available (e.g. as a user interacts with a device), that data may be processed in real-time to determine neurostate characteristics and/or metrics. The neurostate characteristics and/or metrics may be transmitted to neurostate layer for further analysis and decision making.

The action layer 224 is a layer that generally determines appropriate system responses based on the neurostate and/or contextual triggers. The action layer may determine actions based on input received from one or more of neurostate layer 222, trigger layer 221, backend 223, and/or local storage 226. Action layer 224 may adjust the content to be presented and/or the manner or format (e.g. a user interface) in which the content is presented to a user. In this way, the action layer serves to adapt output to be presented to a user in a customized manner corresponding to a user's current neurostate and/or a detected change in a user's neurostate.

The presentation layer 225 is a layer that generally adapts the interface, content, and/or assistant behavior accordingly for each user. The presentation layer may display information in custom manner, as determined by the action layer 224, that is tailored to the user's neurostate characteristics. The presentation layer may receive and/or monitor user interactions with displayed information. The presentation layer may provide feedback to trigger layer.

Local storage 226 is generally operable to store data related to neuroperformance state, triggers, and/or actions. Local storage 226 may store tasks, thresholds, and/or preferences. Local storage 226 may receive instruction from trigger layer. Local storage 226 may provide data to action layer.

Figure 2B:
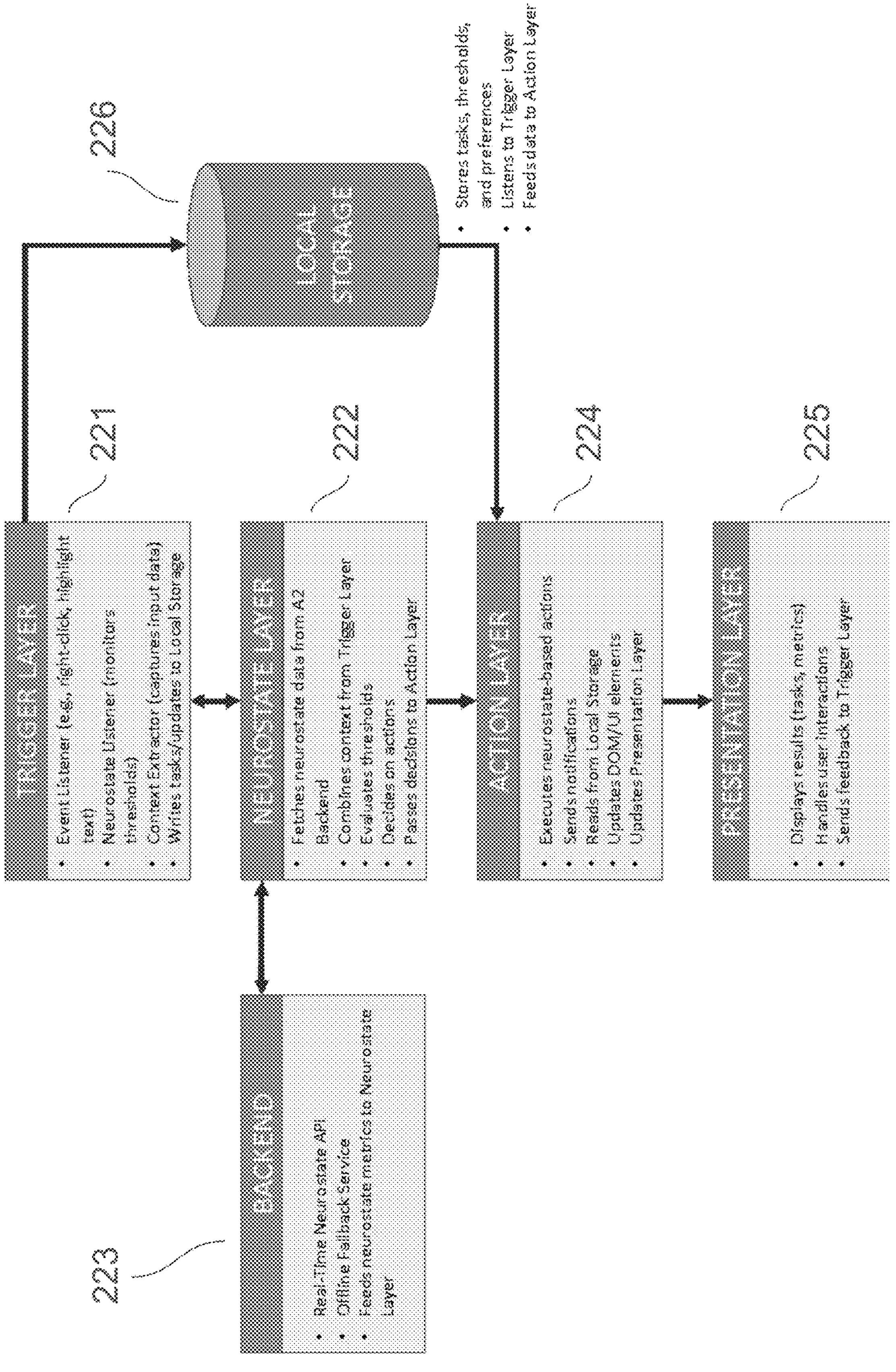
FIG. 2B illustrates a system architecture for systems and methods for facilitating customized artificial intelligence output based on user neuroperformance state in accordance with an exemplary embodiment of the present invention.
Figure 3:
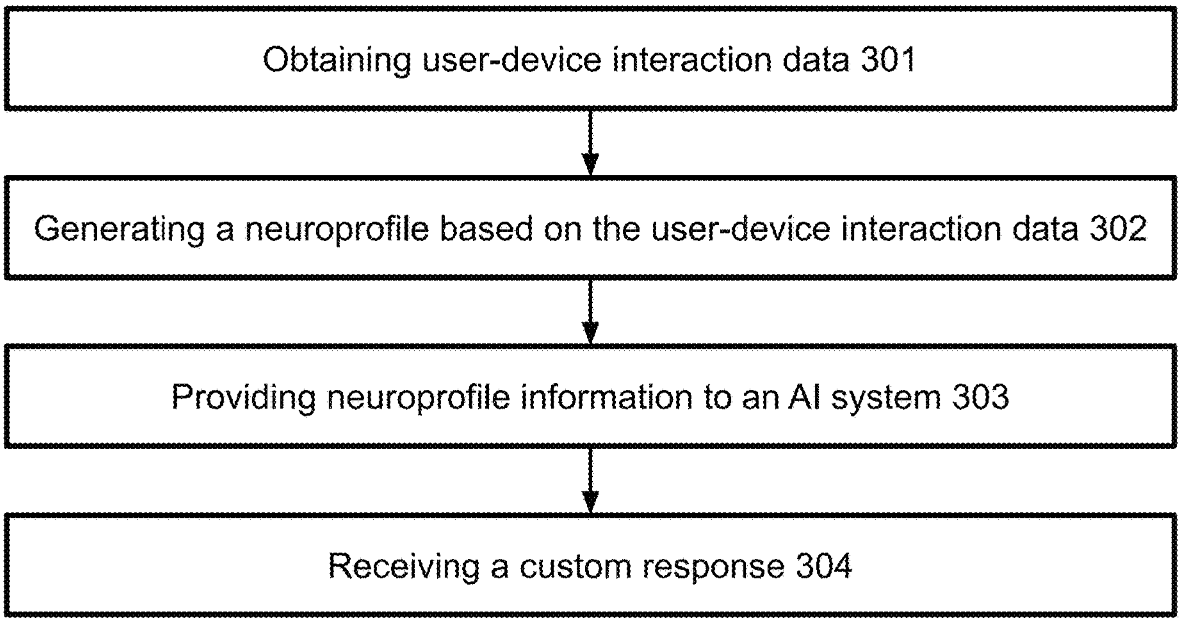
FIG. 3 illustrates an exemplary computer implemented process for systems and methods for facilitating customized artificial intelligence output based on user neuroperformance state according to one embodiment of the invention.

FIG. 3 illustrates an exemplary process for facilitating customized AI output for a user based on a neurostate associated with the user. The process comprises obtaining user-device interaction data 301, generating a neuroprofile based on the user-device interaction data 302, providing neuroprofile information to an AI system 303, and receiving a custom response 304. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

In one embodiment, the process of obtaining user-device interaction data 301 involves capturing finger device events and generating a neuroprofile. This process is designed to create a dynamic and evolving representation of a user's cognitive, motor, and behavioral states over time, taking into account various temporal cycles such as intraday, weekly, and seasonal patterns.

The user-device interaction data is collected through various means, such as a browser plugin, a local desktop application, or a smartphone application that captures touch interactions. The data collection service can be integrated into a web application where the user interacts with an intelligent assistant or chatbot, allowing the system to collect keystroke data. Alternatively, the data collection service can be implemented as a background service that runs on the user's device, either as a standalone application or as a component embedded within the operating system itself, such as Android or iOS. This embedded service enables the system to log any user interaction across different applications.

The data collection process involves obtaining user input data through various methods, such as key logging, web browser input, and touch events, at different time points. The collected data is then evaluated to determine if it is sufficient to generate a comprehensive neuroprofile. This evaluation may involve assessing the quantity and quality of the data, as well as its distribution across different time intervals. If the collected data is deemed insufficient, the system may employ techniques such as synthetic data generation to fill in the gaps and ensure that the resulting dataset is adequate for constructing a reliable neuroprofile.

The process of generating a neuroprofile 302 may be an ongoing and iterative process. Initially, the system may collect data at a specific time point to generate an initial neuroprofile. As the user continues to interact with their devices, the system periodically collects new data to update and refine the neuroprofile. This approach allows the neuroprofile to adapt to changes in the user's cognitive, motor, and behavioral states over time, reflecting both short-term fluctuations and long-term trends.

To capture the temporal dynamics of the user's neuroperformance, the system may incorporate metrics that represent different trends and patterns in the user's cognitive, motor, and behavioral states. These metrics are calculated over various time scales, such as intraday, weekly, and seasonal cycles. As new user-device interaction data is collected, these metrics are adjusted and updated to better reflect the user's current state and historical patterns. This continuous refinement process ensures that the neuroprofile remains an accurate and up-to-date representation of the user's neuroperformance.

Alternatively, the data collection process can be implemented using a client-server architecture, where the user's device acts as a client and sends the collected interaction data to a central server for processing and neuroprofile generation. This approach allows for more centralized control and management of the data collection process, as well as the ability to leverage more powerful computing resources for data analysis and neuroprofile construction.

Another alternative is to employ a federated learning approach, where the user's device performs some local processing and feature extraction on the collected interaction data before sending the processed data to a central server for aggregation and neuroprofile generation. This approach can help to reduce the amount of raw data that needs to be transmitted over the network, while still allowing for the construction of a comprehensive neuroprofile that takes into account data from multiple users and devices.

In one embodiment, the process of generating a neuroprofile based on user-device interaction data involves analyzing and interpreting the collected data to create a comprehensive representation of the user's cognitive, motor, and emotional/behavioral states. The neuroprofile is designed to capture not only the user's current state but also the changes and patterns in their neuroperformance over various time scales, such as daily, weekly, and monthly cycles.

The neuroprofile generation process begins by identifying relevant features and vectors associated with the user-device interaction data. These features may include metrics such as typing speed, keystroke dynamics, touch pressure, swipe patterns, and other indicators of the user's motor skills, cognitive abilities, and emotional states. The identified features are then subjected to various statistical and machine learning techniques, such as scoring, ranking, and clustering, to extract meaningful insights and patterns from the data.

The resulting neuroprofile comprises multiple categories that represent different aspects of the user's neuroperformance. These categories may include motor skills, cognitive skills, emotional/behavioral factors, daily peak performance times, current state, recent changes, and long-term patterns. Each category is further divided into specific subcategories or dimensions that provide a more granular understanding of the user's neuroperformance.

For example, the motor skills category may include dimensions such as agility, reflexes, coordination, strength, balance, and dexterity. These dimensions are derived from the user's device interaction data, such as the speed and accuracy of their keystrokes, the smoothness of their swipe gestures, and the pressure applied during touch interactions. By analyzing these metrics over time, the neuroprofile can identify trends and patterns in the user's motor skills, such as improvements or declines in specific areas.

Similarly, the cognitive skills category may encompass dimensions like executive function, memory, visuospatial skills, attention, perception, and language. These dimensions are inferred from the user's device interaction data, such as the complexity of their language use, the efficiency of their navigation patterns, and the speed and accuracy of their information processing. The neuroprofile tracks changes in these cognitive dimensions over time, allowing for the identification of peak performance periods, as well as potential areas for improvement.

The emotional/behavioral category of the neuroprofile includes dimensions such as fatigue, mood, stress, motivation, social interaction, and impulse control. These dimensions are derived from a combination of device interaction data and other contextual information, such as the timing and frequency of the user's interactions, the content of their communication, and their response patterns to specific stimuli. By monitoring these emotional/behavioral indicators, the neuroprofile can provide insights into the user's overall well-being and help identify potential sources of stress or distress.

To ensure that the neuroprofile remains up-to-date and relevant, the system continuously updates the profile as new user-device interaction data becomes available. This involves periodically re-evaluating the identified features and vectors, adjusting the scores and rankings, and refining the insights and patterns derived from the data. By incorporating the latest data into the neuroprofile, the system can capture changes in the user's neuroperformance over time, including short-term fluctuations and long-term trends.

Alternatively, the neuroprofile generation process can employ advanced machine learning techniques, such as deep learning and neural networks, to automatically learn and extract relevant features from the user-device interaction data. These techniques can help uncover complex patterns and relationships in the data that may not be apparent through traditional statistical methods, leading to a more accurate and nuanced understanding of the user's neuroperformance.

Another alternative approach is to incorporate additional data sources, such as biometric sensors or environmental data, into the neuroprofile generation process. For example, data from wearable devices that monitor the user's heart rate, sleep patterns, or physical activity levels can provide valuable insights into their physiological state and its impact on their cognitive, motor, and emotional functioning. Similarly, data about the user's environment, such as ambient noise levels, temperature, or lighting conditions, can help contextualize their device interaction data and provide a more comprehensive understanding of their neuroperformance.

In one embodiment, the process of providing neuroprofile information to an AI system involves the transfer of relevant data and insights derived from the user's neuroprofile to an AI-powered platform or application. This process enables the AI system to adapt its responses and interactions with the user based on their current cognitive, motor, and emotional state, as well as their historical patterns and trends.

The neuroprofile information can be provided to the AI system in two primary ways: actively or passively. In the active mode, the transfer of neuroprofile information is triggered by a user-initiated action that results in an interaction with the AI system. For example, when a user begins typing a query into an AI-powered search engine, the system may receive the user's current neuroprofile information, including their cognitive state, attention level, and language processing abilities. This information allows the AI system to tailor its search results and suggestions to the user's specific needs and preferences at that moment.

In the passive mode, the transfer of neuroprofile information occurs based on predefined criteria or thresholds, without requiring explicit user interaction. For instance, the system may be configured to provide neuroprofile information to the AI system at specific times of the day when the user's neurostate is known to change, such as during their daily peak performance periods or when they typically experience a dip in cognitive function. Additionally, the system may monitor the user's cognitive metrics in real-time and trigger the transfer of neuroprofile information when certain thresholds are met, such as a significant increase in stress levels or a decrease in attention span.

When providing neuroprofile information to the AI system, the process includes specific instructions or parameters that guide the AI system in adapting its responses to the user's unique neuroprofile. These instructions may specify how the AI system should modify its communication style, content presentation, or interaction flow based on the user's cognitive abilities, emotional state, and behavioral patterns. For example, if the user's neuroprofile indicates a high level of stress and low attention span, the AI system may be instructed to provide more concise and focused information, use simpler language, and break down complex tasks into smaller, more manageable steps.

The actual transfer of neuroprofile information to the AI system can be accomplished through various technical means, such as APIs (Application Programming Interfaces), web services, or direct database access. The neuroprofile data may be formatted and structured in a way that is compatible with the AI system's input requirements, such as JSON (JavaScript Object Notation) or XML (eXtensible Markup Language). The transfer process may also involve security measures, such as encryption and authentication, to ensure the confidentiality and integrity of the user's neuroprofile information.

Once the AI system receives the neuroprofile information, it can use this data to inform its decision-making processes and generate personalized responses for the user. This may involve applying machine learning algorithms, natural language processing techniques, or other AI-powered methods to analyze the neuroprofile data and determine the most appropriate course of action. The AI system may also combine the neuroprofile information with other contextual data, such as the user's location, time of day, or past interactions, to provide an even more tailored and relevant experience.

Alternatively, the process of providing neuroprofile information to an AI system can be implemented using a more decentralized approach, such as edge computing or federated learning. In this case, the user's device or a local server may perform some of the processing and adaptation of the AI system's responses based on the user's neuroprofile, rather than relying solely on a central AI platform. This approach can help reduce latency, improve privacy, and enable more real-time adaptations to the user's changing neurostate.

Another alternative is to employ a hybrid approach that combines both active and passive modes of neuroprofile information transfer. In this scenario, the system may actively provide neuroprofile data to the AI system during user-initiated interactions, while also passively monitoring the user's neurostate and triggering additional data transfers when relevant changes or thresholds are detected. This hybrid approach allows for a more comprehensive and responsive adaptation of the AI system's behavior to the user's evolving neuroperformance.

In one embodiment, the process of receiving a custom response involves the user device obtaining a personalized output from the AI system based on the provided neuroprofile information. This custom response is tailored to the user's specific cognitive, motor, and emotional state, as well as their historical patterns and preferences, to ensure a more relevant and engaging user experience.

Once the AI system has processed the user's neuroprofile information and generated a custom response, the user device receives this response through a suitable communication channel, such as an API, web service, or direct data transfer. The response may be formatted in a way that is compatible with the user device's display and interaction capabilities, such as HTML (Hypertext Markup Language), JSON, or XML.

Upon receiving the custom response, the user device renders and displays the content in a manner that is optimized for the user's current neurostate and preferences. This may involve adjusting the visual layout, font size, color scheme, or other design elements to ensure maximum readability and usability based on the user's cognitive and perceptual abilities. For example, if the user's neuroprofile indicates a high level of fatigue or low attention span, the user device may display the content in a simplified format with larger text and fewer distractions.

The custom response generated by the AI system can be inclusive and/or exclusive, depending on the user's specific neuroprofile and the context of the interaction. An inclusive response may involve adding or emphasizing certain content elements that are particularly relevant or beneficial to the user's current neurostate. For instance, if the user's neuroprofile indicates a high level of stress, the AI system may include stress-reduction techniques, relaxation exercises, or other coping strategies in the custom response. Similarly, if the user's neuroprofile suggests a strong interest in a particular topic or hobby, the AI system may incorporate more information or recommendations related to that subject in the response.

On the other hand, an exclusive response may involve filtering out or avoiding certain content elements that could potentially exacerbate the user's current neurostate or be inappropriate given their specific condition. For example, if the user's neuroprofile indicates signs of depression, the AI system may exclude content that could trigger or worsen depressive symptoms, such as news articles about negative events or social media posts with pessimistic tones. Likewise, if the user's neuroprofile suggests a particular health condition or disorder, the AI system may avoid recommending activities or products that are not suitable for individuals with that condition.

The process of generating inclusive and exclusive custom responses relies on the AI system's ability to analyze the user's neuroprofile information and apply domain-specific knowledge and rules to determine the most appropriate content and recommendations. This may involve using machine learning algorithms, natural language processing techniques, and other AI-powered methods to identify patterns, extract insights, and make informed decisions based on the user's unique neurostate and preferences.

Alternatively, the process of receiving a custom response can be implemented using a more interactive and dynamic approach, where the user device and the AI system engage in a continuous feedback loop. In this scenario, the user device may send real-time updates about the user's neurostate and behavior to the AI system, allowing it to adapt and refine the custom response on the fly. For example, if the user's attention level or emotional state changes while interacting with the content, the AI system can immediately adjust the response to maintain engagement and relevance.

Another alternative is to employ a hybrid approach that combines server-side and client-side processing for generating and displaying custom responses. In this case, the AI system may generate a general framework or template for the custom response, which is then transmitted to the user device. The user device can then use its local processing capabilities to further personalize and optimize the response based on the user's specific device characteristics, such as screen size, resolution, or input modalities. This hybrid approach can help reduce latency, improve responsiveness, and provide a more seamless user experience.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the neuroperformance system 103 and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
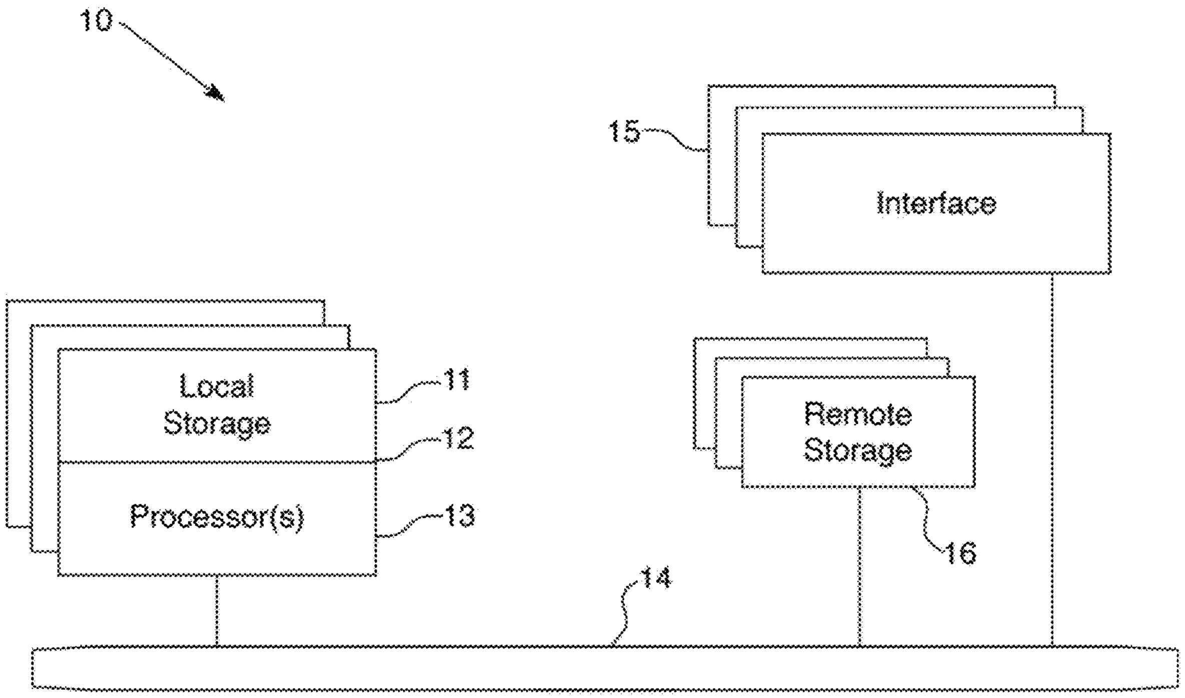
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
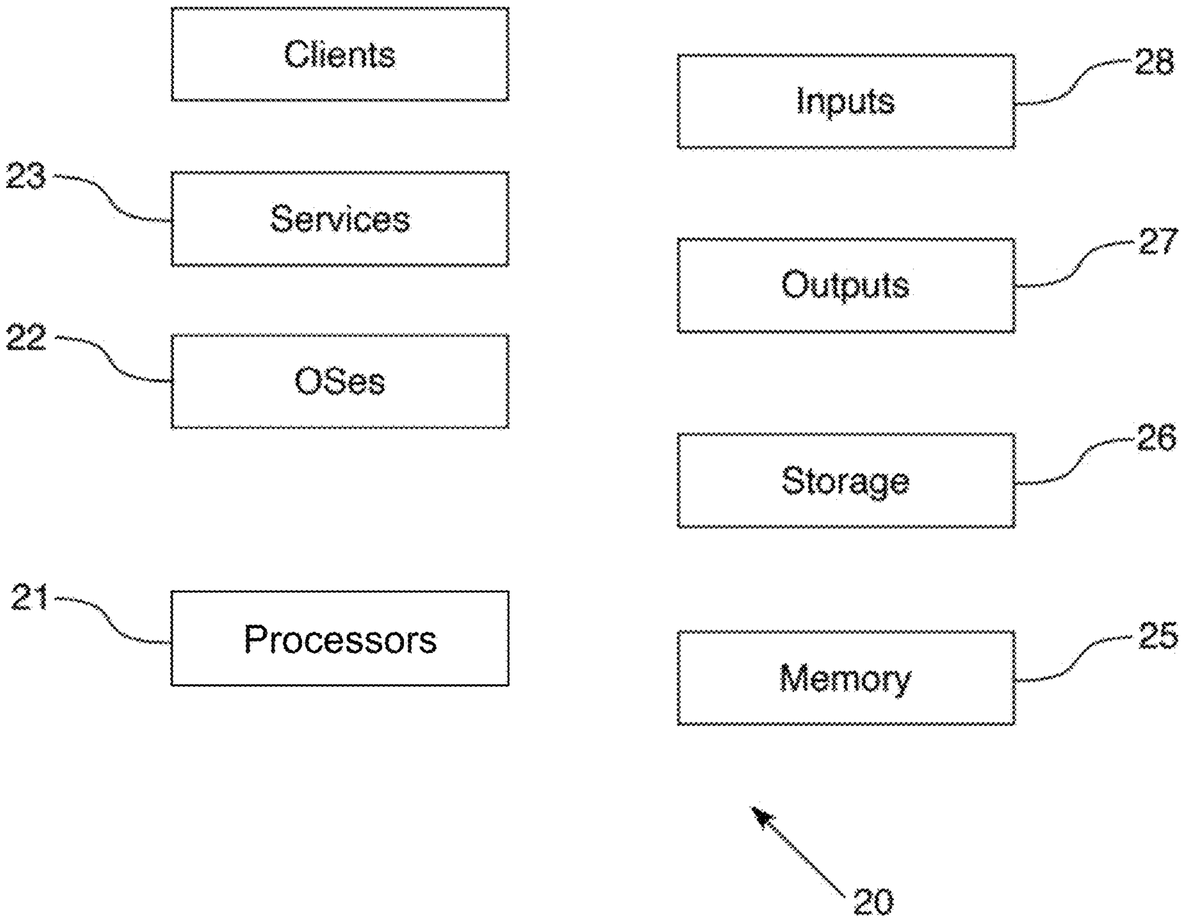
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
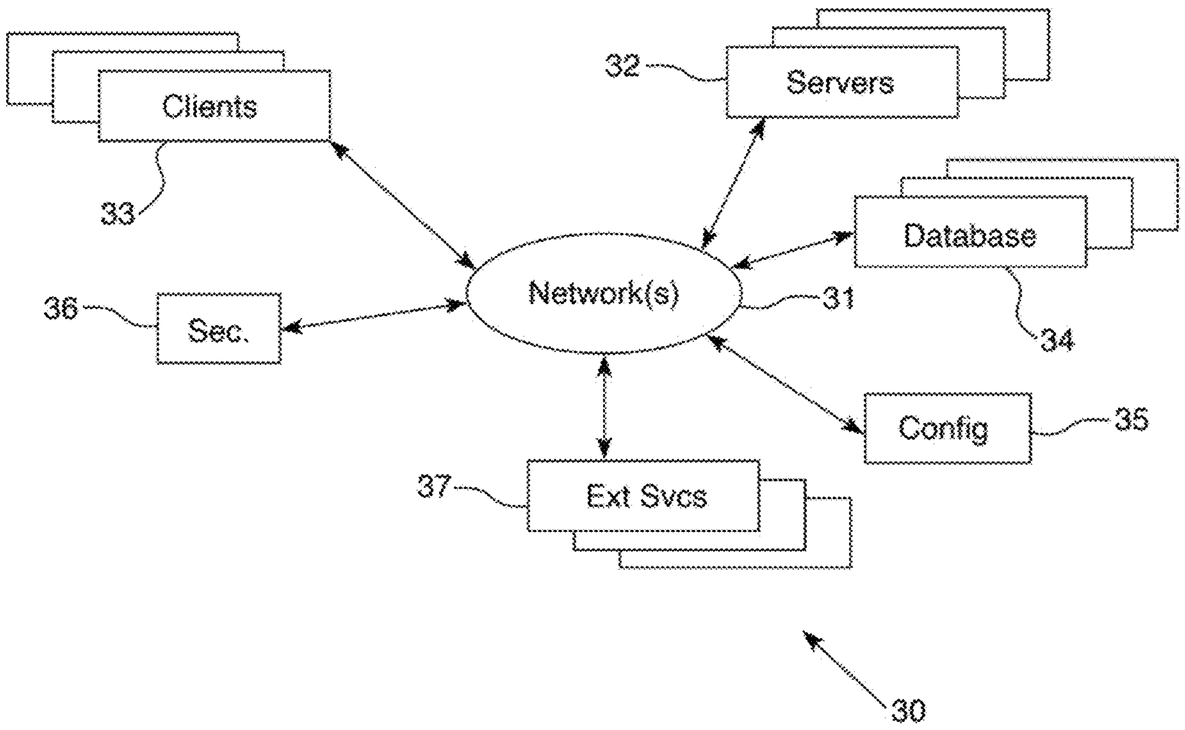
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
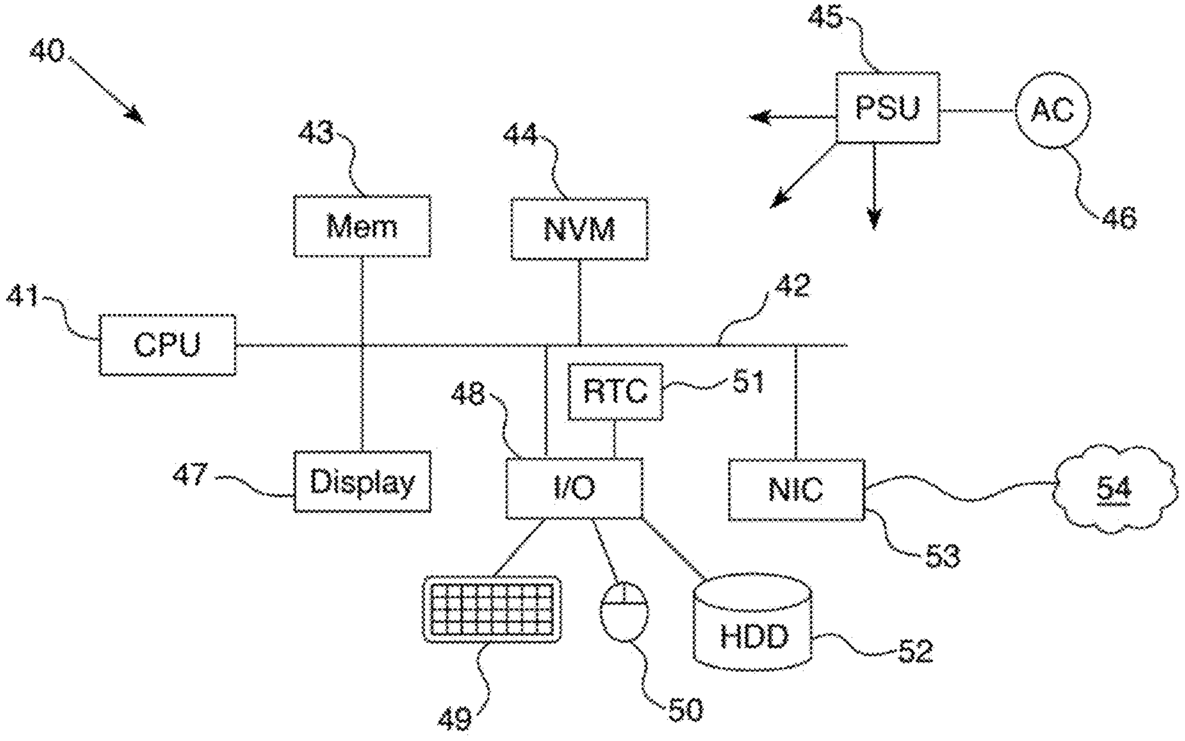
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method for facilitating customized artificial intelligence (AI) output for a user based on a neurostate associated with the user, the method comprising:

obtaining, by a computing device, user-device interaction data associated with interactions between the user and a user device, wherein the user-device interaction data comprises raw signal data collected from the user device;

generating, by the computing device, a set of user-device interaction metrics from the user-device interaction data;

generating, by the computing device, a neuroprofile based on the set of user-device interaction metrics, wherein generating the neuroprofile comprises:

identifying a plurality of features or vectors associated with the user-device interaction metrics;

applying a machine learning model to the plurality of features or vectors to generate a set of neuroprofile metrics, wherein the machine learning model is trained using a dataset of user-device interaction data and corresponding neuroprofile data;

determining, based on the set of neuroprofile metrics, at least one of a motor skill metric, a cognitive skill metric, and an emotional and/or behavioral metric; and storing the neuroprofile in association with a user identifier;

providing, by the computing device, the neuroprofile to an AI system, wherein the AI system is configured to generate a custom response based on the neuroprofile; and receiving, by the computing device, the custom response from the AI system, wherein the custom response comprises at least one of a personalized content recommendation, a targeted advertisement, or a customized user interface adaptation.

2. The method of claim 1, wherein the raw signal data is collected from at least one of a touchscreen, a keyboard, a mouse, an accelerometer, and a gyroscope of the computing device.

3. The method of claim 1, wherein the machine learning model comprises at least one of a support vector machine, a random forest, a gradient boosting machine, or a deep neural network.

4. The method of claim 1, wherein the motor skill metric comprises at least one of agility, reflexes, coordination, strength, balance and dexterity.

5. The method of claim 1, wherein the motor skill metric is derived from at least one of a typing speed, a typing accuracy, a cursor control precision, or a touch gesture variability metric.

6. The method of claim 1, wherein the cognitive skill metric comprises at least one of executive function, memory, visuospatial skills, attention, perception, and language.

7. The method of claim 1, wherein the cognitive skill metric is derived from at least one of a response time variability metric, an error rate metric, or a decision-making speed metric.

8. The method of claim 1, wherein the emotional and/or behavioral metric comprises at least one of a fatigue metric, mood metric, stress level metric, motivation metric, social interaction metric, and impulse control metric.

9. The method of claim 1, further comprising:

obtaining, by the computing device, contextual data associated with the user or the user device, wherein the contextual data comprises at least one of a time of day, a location, and an application usage history; and generating, by the computing device, the neuroprofile based on both the set of user-device interaction metrics and the contextual data.

10. The method of claim 1, further comprising:

obtaining, by the computing device, physiological data associated with the user, wherein the physiological data comprises at least one of a heart rate, skin conductance, voice tone, facial expression, and eye movement; and generating, by the computing device, the neuroprofile based on both the set of user-device interaction metrics and the physiological data.

11. The method of claim 1, further comprising:

periodically obtaining, by the computing device, additional user-device interaction data;

updating, by the computing device, the neuroprofile based on the additional user-device interaction data; and providing, by the computing device, the updated neuroprofile to the AI system.

12. The method of claim 1, wherein providing the neuroprofile to the AI system comprises:

encrypting, by the computing device, the neuroprofile using a secure encryption algorithm; and transmitting, by the computing device, the encrypted neuroprofile to the AI system over a secure communication channel.

13. The method of claim 1, wherein providing the neuroprofile to the AI system comprises:

transmitting, by the computing device, the neuroprofile to the AI system as a header or supplement to a prompt being provided to the AI system.

14. The method of claim 1, further comprising preprocessing, by the computing device, the raw signal data to generate the set of user-device interaction metrics.

15. The method of claim 14, wherein preprocessing the raw signal data comprises:

applying a noise reduction algorithm to the raw signal data to remove artifacts or outliers;

segmenting the raw signal data into a plurality of time windows; and extracting, for each time window of the plurality of time windows, a set of statistical features comprising at least one of a mean, a median, a standard deviation, a kurtosis, or a skewness of the raw signal data within the time window.

16. A computing system for facilitating customized artificial intelligence (AI) output for a user based on a neurostate associated with the user, the computing system comprising:

at least one computing processor; and memory comprising instructions that, when executed by the at least one computing processor, enable the computing system to execute a method comprising:

obtaining, by a computing device, user-device interaction data associated with interactions between the user and a user device, wherein the user-device interaction data comprises raw signal data collected from the user device;

generating, by the computing device, a set of user-device interaction metrics from the user-device interaction data;

generating, by the computing device, a neuroprofile based on the set of user-device interaction metrics, wherein generating the neuroprofile comprises:

identifying a plurality of features or vectors associated with the user-device interaction metrics;

applying a machine learning model to the plurality of features or vectors to generate a set of neuroprofile metrics, wherein the machine learning model is trained using a dataset of user-device interaction data and corresponding neuroprofile data;

determining, based on the set of neuroprofile metrics, at least one of a motor skill metric, a cognitive skill metric, and an emotional and/or behavioral metric; and storing the neuroprofile in association with a user identifier;

providing, by the computing device, the neuroprofile to an AI system, wherein the AI system is configured to generate a custom response based on the neuroprofile; and receiving, by the computing device, the custom response from the AI system, wherein the custom response comprises at least one of a personalized content recommendation, a targeted advertisement, or a customized user interface adaptation.

17. A non-transitory computer readable medium comprising instructions that when executed by a processor enable the processor to execute a method comprising:

obtaining, by a computing device, user-device interaction data associated with interactions between the user and a user device, wherein the user-device interaction data comprises raw signal data collected from the user device;

generating, by the computing device, a set of user-device interaction metrics from the user-device interaction data;

generating, by the computing device, a neuroprofile based on the set of user-device interaction metrics, wherein generating the neuroprofile comprises:

identifying a plurality of features or vectors associated with the user-device interaction metrics;

applying a machine learning model to the plurality of features or vectors to generate a set of neuroprofile metrics, wherein the machine learning model is trained using a dataset of user-device interaction data and corresponding neuroprofile data;

determining, based on the set of neuroprofile metrics, at least one of a motor skill metric, a cognitive skill metric, and an emotional and/or behavioral metric; and storing the neuroprofile in association with a user identifier;

providing, by the computing device, the neuroprofile to an AI system, wherein the AI system is configured to generate a custom response based on the neuroprofile; and receiving, by the computing device, the custom response from the AI system, wherein the custom response comprises at least one of a personalized content recommendation, a targeted advertisement, or a customized user interface adaptation.

* * * * *